(12) United States Patent
Seo et al.

(10) Patent No.: US 9,971,085 B2
(45) Date of Patent: May 15, 2018

(54) LIGHT SOURCE MODULE AND BACKLIGHT UNIT INCLUDING THE SAME

(71) Applicant: Samsung Display Co. Ltd., Yongin, Gyeonggi-Do (KR)

(72) Inventors: Jin Seo, Osan-si (KR); Jae Joong Kwon, Suwon-si (KR); Seul Gi Kim, Seoul (KR); Ha Young Lee, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 17 days.

(21) Appl. No.: 14/306,534

(22) Filed: Jun. 17, 2014

(65) Prior Publication Data

US 2015/0219289 A1 Aug. 6, 2015

(30) Foreign Application Priority Data

Feb. 5, 2014 (KR) .................. 10-2014-0013185

(51) Int. Cl.
*F21V 8/00* (2006.01)
*G02F 1/1335* (2006.01)
*G02F 1/35* (2006.01)

(52) U.S. Cl.
CPC ......... *G02B 6/0073* (2013.01); *G02B 6/0023* (2013.01); *G02F 1/133615* (2013.01); *G02F 1/353* (2013.01); *G02F 2001/133614* (2013.01); *G02F 2202/36* (2013.01)

(58) Field of Classification Search
CPC ............... G02B 6/0073; G02B 6/0023; G02F 1/133615; G02F 1/353; G02F 2202/36; G02F 2001/133614
USPC .......................................... 362/84
See application file for complete search history.

(56) References Cited

U.S. PATENT DOCUMENTS

| | | | |
|---|---|---|---|
| 2007/0008739 A1* | 1/2007 | Kim ................ | G02B 6/0021 362/612 |
| 2008/0030993 A1* | 2/2008 | Narendran ......... | G02B 6/0003 362/296.07 |
| 2009/0168395 A1* | 7/2009 | Mrakovich .......... | F21S 4/008 362/84 |
| 2011/0309325 A1 | 12/2011 | Park et al. | |
| 2012/0155115 A1 | 6/2012 | Jang | |
| 2012/0287600 A1* | 11/2012 | Iden .................. | F21S 8/006 362/2 |
| 2013/0050612 A1 | 2/2013 | Hur et al. | |
| 2014/0334137 A1* | 11/2014 | Hasenoehrl .......... | F21K 9/00 362/147 |
| 2016/0223870 A1* | 8/2016 | Miki ................ | G02F 1/133617 |

FOREIGN PATENT DOCUMENTS

| | | | | |
|---|---|---|---|---|
| CN | 101497784 B | * | 3/2012 | ............. C08K 11/02 |
| KR | 2011068109 A | * | 6/2011 | ............. G02F 1/1345 |

* cited by examiner

*Primary Examiner* — Sharon Payne
(74) *Attorney, Agent, or Firm* — Cantor Colburn LLP

(57) ABSTRACT

A light source module includes a circuit board, a light-emitting diode package configured to be mounted on the circuit board, and a quantum dot package which is disposed apart from a side of the light-emitting diode package by a predetermined distance, and mounted on the circuit board and to convert a wavelength of light incident thereupon.

20 Claims, 27 Drawing Sheets

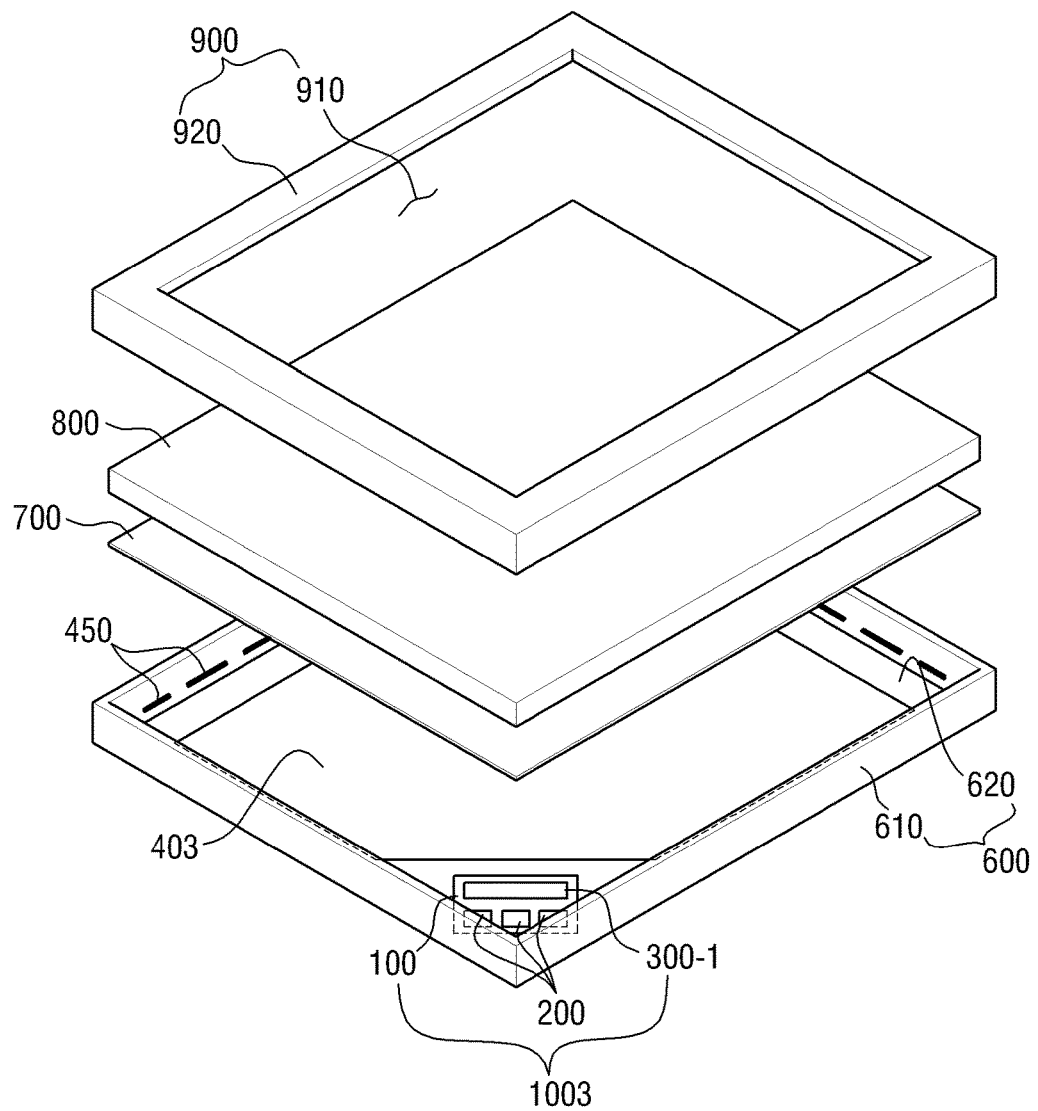

őLIGHT SOURCE MODULE AND BACKLIGHT UNIT INCLUDING THE SAME

This application claims priority to Korean Patent Application No. 10-2014-0013185 filed on Feb. 5, 2014, and all the benefits accruing therefrom under 35 U.S.C. § 119, the disclosure of which is incorporated herein by reference in its entirety.

BACKGROUND

1. Field

Exemplary embodiments relate to a light source module and a backlight unit including the same.

2. Description of the Related Art

Liquid crystal displays ("LCDs") have been of great importance in the field of information display technology. LCDs are display devices which include liquid crystal molecules interposed between a pair of glass substrates, and display information by applying power via a power supply on or below the glass substrates so as for the liquid crystal molecules to emit light.

Since LCDs cannot emit light by themselves but merely are light-receiving devices which display an image by adjusting the transmittance of light incident thereupon from an external source, an additional device for applying light to a liquid crystal panel, i.e., a backlight unit, is needed.

Light-emitting diodes ("LEDs"), which emit light in response to a current flowing thereto, have been increasingly popular as a light source for the backlight unit of an LCD. LEDs have been widely used for applications such as lighting devices, electric signs, and backlight units for display devices due to their long lifetime, low power consumption, rapid response speed, and excellent initial driving properties, making rapid inroads into various other applications.

In the case of using an LED light source, quantum dot materials may be used to improve a purity of colors. Quantum dot materials emit light while excited electrons transition from a conduction band to a valence band. Even quantum dots that are formed of the same material may have different wavelengths according to their particle sizes. Since the smaller the quantum dots, the shorter the wavelength of light emitted by the quantum dots, light of a desired wavelength range may be obtained by controlling the size of the quantum dots.

SUMMARY

An optical efficiency of quantum dots may be adversely affected by heat, and research has been conducted on ways to effectively reduce any heat-induced decrease in an optical efficiency of quantum dots while realizing white light with high color reproducibility with the use of the quantum dots.

Embodiments provide a light source module which is capable of effectively preventing a quantum dot package from deteriorating due to heat generated by a light-emitting diode ("LED") package, and realizing white light with high color reproducibility.

Embodiments also provide a light source module which is capable of variably arranging an LED and a quantum dot material.

Embodiments also provide a light source module which is easy to manufacture and arrange in a display device.

However, embodiments are not restricted to the one set forth herein. The above and other embodiments will become more apparent to one of ordinary skill in the art to which the invention pertains by referencing the detailed description of the exemplary embodiments given below.

According to embodiments, there is provided a light source module including a circuit board, an LED package configured to be mounted on the circuit board, and a quantum dot package which is on the circuit board and disposed apart from a side of the LED package by a distance and configured to convert a wavelength of light incident thereupon.

In an exemplary embodiment, the distance between the LED package and the quantum dot package may be greater than 0 millimeter (mm) and less than about 0.8 mm.

In an exemplary embodiment, the quantum dot package may include a light leakage preventing member protruding outwardly from a top of the quantum dot package from the LED package.

In an exemplary embodiment, the quantum dot package may have an inversely tapered shape such that a width of the quantum dot package gradually decreases from a top to a bottom of the quantum dot package.

In an exemplary embodiment, the LED package and the quantum dot package may be disposed on the circuit board, and on the same horizontal plane in a cross section.

In an exemplary embodiment, the LED package may include an LED chip electrically connected to the circuit board, and a surface of the LED chip may be substantially perpendicular to the circuit board.

In an exemplary embodiment, the LED package may include a light exit plane through which light is emitted, and the light exit plane may be substantially perpendicular to the circuit board.

In an exemplary embodiment, the light source module may further include mounting dots configured to be disposed between the quantum dot package and the circuit board, where the quantum dot package may be mounted on the mounting dots disposed on the circuit board.

In an exemplary embodiment, the mounting dots may be further configured to include lead-free solder (Pb), copper (Cu), aluminum (Al), nickel (Ni), a pressure-sensitive adhesive or an optically transparent adhesive.

In an exemplary embodiment, the quantum dot package may include a quantum dot material and an encapsulating unit which accommodates the quantum dot material, and includes a light incidence plane which is provided on a first side of the encapsulating unit facing the LED package and receives light, and a light emission plane which is provided on a second side opposing the first side of the encapsulating unit and through which the received light is emitted.

In an exemplary embodiment, the encapsulating unit may include a heat-dissipating material.

According to another embodiment, there is provided a light source module including a circuit board, a plurality of LED packages which is mounted on the circuit board and to be arranged in a row direction; and a quantum dot package which is disposed apart from a side of a light-emitting diode package of the plurality of LED packages by a predetermined distance and extends in the row direction in which the LED packages are arranged, where the quantum dot package extends to a length sufficient to overlap the LED packages when viewed from a direction substantially perpendicular to the direction in which the plurality of LED packages is arranged.

In an exemplary embodiment, the plurality of LED packages and the quantum dot package may be disposed on the circuit board and on the same horizontal plane.

In an exemplary embodiment, the quantum dot package may include an encapsulating unit, a light incidence plane which is provided on a first side of the encapsulating unit facing the plurality of LED packages and receives light, and a light emission plane which is provided on a side opposing the first side of the encapsulating unit and through which the received light is emitted, and each of the plurality of LED packages includes a light exit plane through which light is emitted and is overlapped by the light incidence plane.

In an exemplary embodiment, the quantum dot package may further include a light leakage effectively preventing member protruding outwardly from a top of the quantum dot package in a direction away from the LED packages and the light leakage preventing member extends in the direction in which the plurality of LED packages is arranged.

In an exemplary embodiment, the quantum dot package may have an inversely tapered shape such that a width of the quantum dot package, in a direction substantially perpendicular to the direction in which the plurality of LED packages are arranged, gradually decreases from the top to the bottom of the quantum dot package.

According to another embodiment, there is provided a backlight unit including a circuit board, an LED package mounted on the circuit board, a quantum dot package which is disposed apart from a side of the LED package b a predetermined distance, mounted on the circuit board and configured to convert the wavelength of light incident thereupon, and a light guide plate disposed on a side of the quantum dot package, where the quantum dot package is further configured to be disposed between the LED package and the light guide plate.

In an exemplary embodiment, the circuit board and the light guide plate may be further configured to be parallel to each other.

In an exemplary embodiment, the quantum dot package may have an inversely tapered shape such that a width of the quantum dot package, in a direction in which the LED package and the quantum dot package are arranged side-by-side, gradually decreases from a top to a bottom of the quantum dot package.

In an exemplary embodiment, the light guide plate may have a shape of a wedge, and may have a thickness that gradually decreases as a distance from the quantum dot package increases.

According to embodiments, it is possible to effectively prevent the efficiency of a light source module from decreasing due to deterioration of a quantum dot material by heat generated by an LED package, while realizing white light with high color reproducibility.

In addition, it is possible to easily adjust the distance between an LED and a quantum dot material, depending on the type of device to which a light source module is applied, and facilitate the manufacture of the light source module.

Other features and exemplary embodiments will be apparent from the following detailed description, the drawings, and the claims.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 27 is a perspective view illustrating an exemplary embodiment of a display device according to the invention.

DETAILED DESCRIPTION

Figure 1:
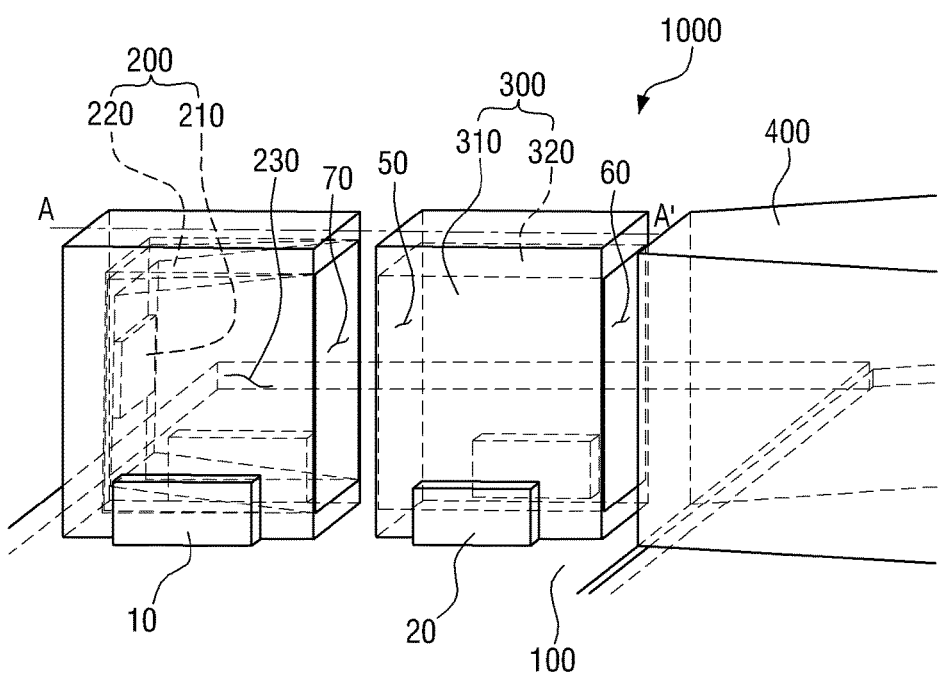
FIG. 1 is a perspective view illustrating an exemplary embodiment of a light source module according to the invention.

The exemplary embodiments and features of the invention and methods for achieving the exemplary embodiments and features will be apparent by referring to the exemplary embodiments to be described in detail with reference to the accompanying drawings. However, the invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the invention is only defined within the scope of the appended claims.

The term "on" that is used to designate that an element is on another element or located on a different layer or a layer includes both a case where an element is located directly on another element or a layer and a case where an element is located on another element via another layer or still another element. In the entire description of the invention, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the attached drawings.

FIG. 1 is a perspective view illustrating a light source module according to an embodiment.

Referring to FIG. 1, a light source module 1000 may include a circuit board 100, a light-emitting diode ("LED") package 200 mounted on the circuit board 100, and a quantum dot package 300 mounted on the circuit board 100 and converting a wavelength of incident light. A light guide plate 400 may be disposed on one side of the quantum dot package 300 of the light source module 1000. The LED package 200, the quantum dot package 300 and the light guide plate 400 may be disposed, one after another, on the circuit board 100 and on the same horizontal plane of in a cross section. The light guide plate 400 will be described later in further detail.

In an exemplary embodiment, the circuit board 100 may include a circuit pattern for applying electric signals to the LED package 200, and the circuit pattern may include a metallic material with excellent electric and thermal conductivities, for example, gold (Au), silver (Ag) or copper (Cu).

In an exemplary embodiment, the LED package 200 may be mounted on the circuit board 100 by surface mounting technology ("SMT"), which will be described later in further detail.

In an exemplary embodiment, the circuit board 100 may be a printed circuit board ("PCB"), and may include an organic resin material including epoxy, triazine, silicone and polyimide, for example, or another organic resin material. In an exemplary embodiment, the circuit board 100 may be a flexible PCB ("FPCB") or a metal core PCB ("MCPCB").

The LED package 200 may include an LED chip 210 electrically connected to an electrode of the circuit board 100 and a molding frame 220 in which an opening is defined that faces the quantum dot package 300. In an exemplary embodiment, the opening of the molding frame 220 may be hermetically sealed with an encapsulating member 230 covered with a phosphor material, for example. The LED chip 210 may be disposed on an inner sidewall of the LED package 200 on a distant side of the LED package 200 from the quantum dot package 300 to be substantially perpendicular to the circuit board 100.

The LED chip 210 of the LED package 200 may emit light through the encapsulating member 230 included in the molding frame 220 and having a phosphor material, in response to an electric signal being applied thereto from the circuit board 100. The LED package 200 may have a light exit plane 70 through which light is emitted toward the quantum dot package 300. The light exit plane 70 may be substantially perpendicular to the circuit board 100.

The LED package 200 may be coupled to, and thus mounted on, the circuit board 100 by a mounting member 10. In an exemplary embodiment, the mounting member 10 may include, for example, solder. In an exemplary embodiment, the LED package 200 may be attached onto the circuit board 100 by SMT. In an exemplary embodiment, the LED package 200, which is coupled to the circuit board 100 by the mounting member 10, may electrically connect the LED chip 210 to an electrode disposed on the circuit board 100, by using a lead frame (not illustrated) or a bump.

In an exemplary embodiment, the LED chip 210 may be a blue LED chip or an ultraviolet ("UV") LED chip. Light generated by the LED chip 210 may be emitted as white light with high purity by being passed through the quantum dot package 300.

The quantum dot package 300 may be disposed on one side of the LED package 200 and may be spaced apart from the LED package 200 by a predetermined distance. The quantum dot package 300, which is mounted on the circuit board 100, may convert the wavelength of light incident thereupon from the LED package 200. The quantum dot package 300 may include a quantum dot material 310 and an encapsulating unit 320 accommodating the quantum dot material 310 therein. The encapsulating unit 320 may include a light incidence plane 50 which is provided on a side of the encapsulating unit 320 facing the LED package 200 and receives light, and a light emission plane 60 which is provided on the other side of the encapsulating unit 320 and through which the received light is emitted.

Light emitted from the LED package 200 may travel toward the quantum dot package 300 through the light exit plane 70 of the LED package 200, may be received by the light incidence plane 50, and may be wavelength-converted into white light. The white light may be emitted from the quantum dot package 300 through the light emission plane 60. The white light emitted through the light emission plane 60 may be incident upon a side of the light guide plate 400, and may then travel toward a display panel (not illustrated) on a viewer's side.

The quantum dot material 310 may convert the wavelength of incident light, and may thus allow the incident light to be emitted as white light. In an exemplary embodiment, the quantum dot material 310 may be a combination of a polymer material and quantum dots. The quantum dots emit light while excited electrons transition from a conduction band to a valence band. Even quantum dots that include the same material may have different wavelengths according to their particle sizes. Since the smaller the quantum dots, the shorter the wavelength of light emitted from the quantum dots, light of a desired wavelength range may be obtained by controlling the size of the quantum dots.

The quantum dots generally have a particle size of about 10 nanometers (nm) or less. Generally, quantum dots with a size of about 55 angstrom (Å) to about 65 Å emit red light, quantum dots with a size of about 40 Å to about 50 Å emit green light, and quantum dots with a size of about 20 Å to about 35 Å emit blue light. Yellow light may be emitted by quantum dots with a size between the sizes of the red light-emitting quantum dots and the green light-emitting quantum dots.

In a case in which a UV LED chip is used, three quantum dots that emit red light, blue light and green light, respectively, in response to receipt of UV light may be combined together to provide a white light-emitting quantum dot material 310. In an alternative exemplary embodiment, in a case in which a blue LED chip is used, two quantum dots that emit red light and blue light, respectively, in response to receipt of blue light may be mixed together to provide the white light-emitting quantum dot material 310.

In an exemplary embodiment, the quantum dots may include one of Si-based nano crystals, group II-VI compound semiconductor nano crystals, group III-V compound semiconductor nano crystals, group IV-VI compound nano crystals and any combinations thereof.

In an exemplary embodiment, the group II-VI compound semiconductor nano crystals may include at least one of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe, for example.

In an exemplary embodiment, the group III-V compound semiconductor nano crystals may include at least one of GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs, for example.

In an exemplary embodiment, the IV-VI compound semiconductor nano crystals may be SbTe.

Figure 2:
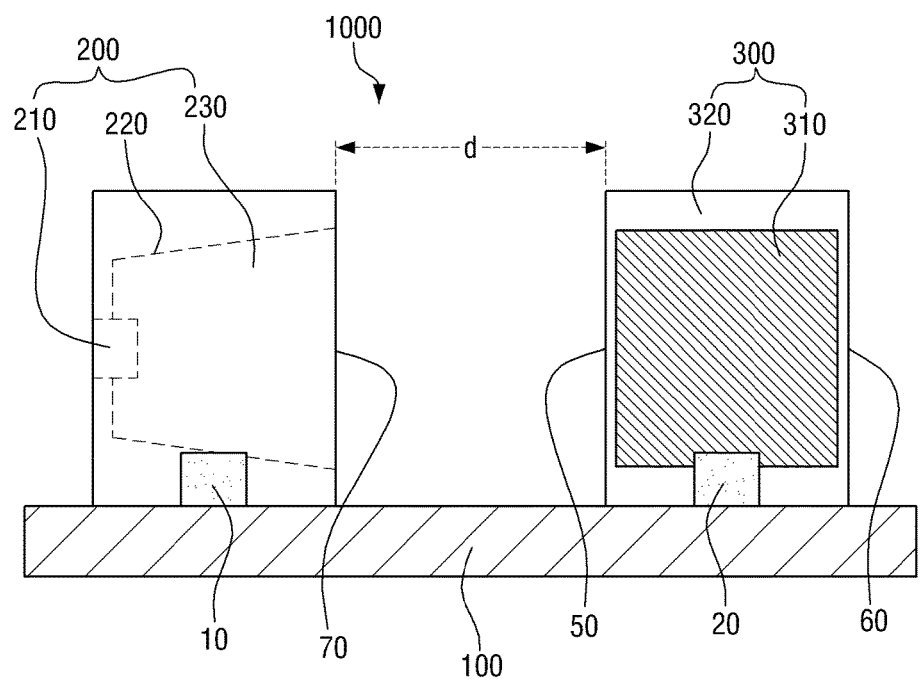
FIG. 2 is a cross-sectional view taken along line A-A' of FIG. 1.

FIG. 2 illustrates a cross-sectional view taken along line A-A' of FIG. 1. Referring to FIG. 2, the quantum dot package 300 and the LED package 200 may be disposed on the circuit board 100 and on the same horizontal plane in a cross section. The light exit plane 70 of the LED package 200 and the light incidence plane 50 of the quantum dot package 300 may face each other, a direction in which light travels from the light exit plane 70 to the light incidence plane 50 may be parallel to the circuit board 100.

The LED package 200 and the quantum dot package 300 may be spaced apart from each other on the circuit board 100 by a predetermined distance d. Since the LED package 200 and the quantum dot package 300 are mounted on the circuit board 100 to be on the same horizontal plane and separate from each other, the distance d may be easily adjusted. More specifically, there may be the need to adjust the distance between an LED and a quantum dot depending on the type of a device to which the light source module 1000 is applied. According to this embodiment, the LED package 200 and the quantum dot package 300 are directly mounted on the circuit board 100 to be on the same horizontal plane. Accordingly, the distance d may be easily adjusted simply by mounting the LED package 200 on the circuit board 100 and then mounting the quantum dot package 300 spaced apart from the LED package 200 by a desired distance.

The distance d may range from 0 millimeter (mm) to about 0.8 mm. The quantum dot material 310 may be damaged by heat. In response to the distance d being about 0 mm, heat from the LED package 200 may be directly transmitted to the quantum dot material 310 of the quantum dot package 300, thereby resulting in damage to the quantum dot material 310. In response to the distance d exceeding about 8 mm, the wavelength conversion efficiency of the quantum dot package 300 may decrease. In response to the distance d falling within the range of about 0 mm to about 8 mm, an appropriate wavelength conversion efficiency may be maintained while preventing deterioration of the quantum dot material 310.

Figure 3:
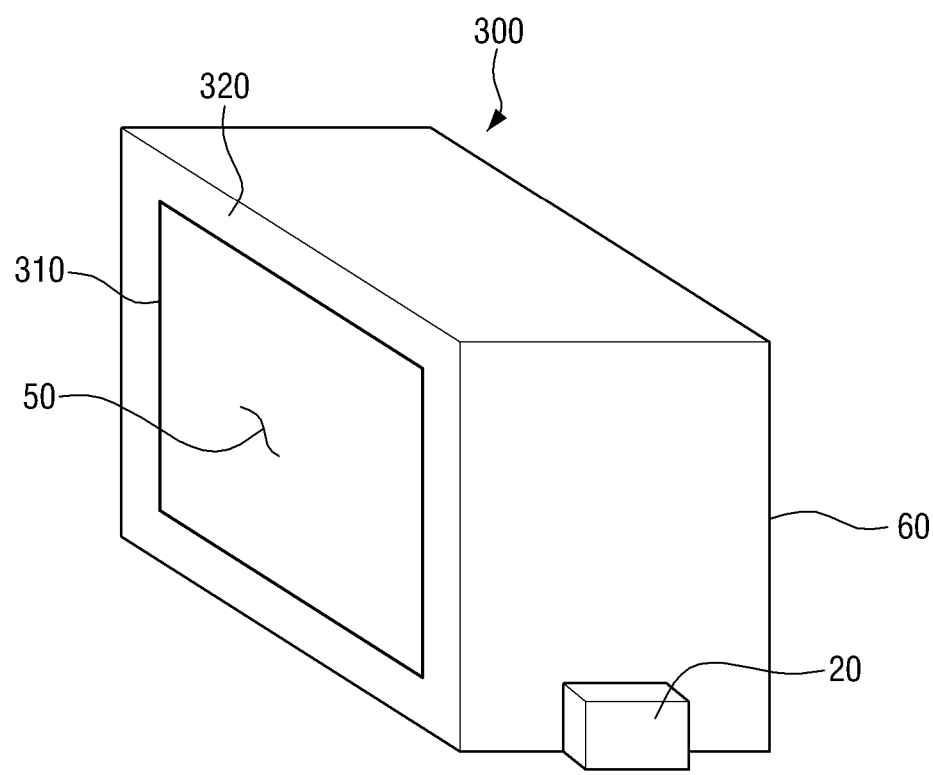
FIG. 3 is a perspective view illustrating an exemplary embodiment of a quantum dot package according to the invention.

Referring to FIG. 3, the quantum dot package 300 may include a tetrahedral encapsulating unit 320. The encapsulating unit 320 may include the light incidence plane 50, which is provided on a side of the quantum dot package 300 facing the LED package 200 and receives light, and the light emission plane 60, which is provided on the other side of the quantum dot package 300 and through which light is emitted. The encapsulating unit 320 is hermetically sealed with the quantum dot material 310, and may thus convert the wavelength of light incident thereupon through the light incidence plane 50 and emit white light with high color reproducibility.

Figure 4:
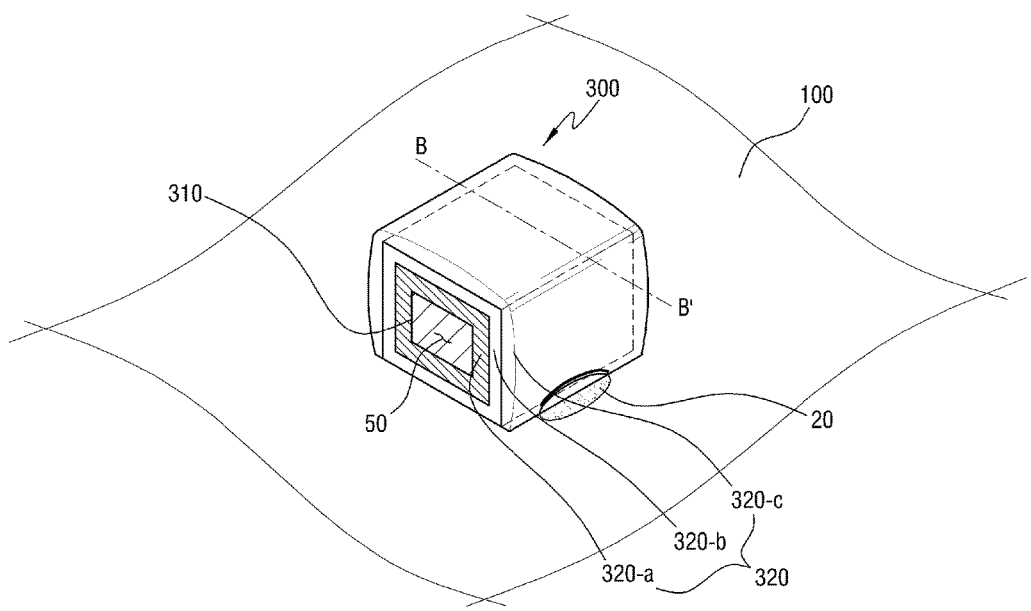
FIG. 4 is a perspective view illustrating another exemplary embodiment of a quantum dot package according to the invention.
Figure 5:
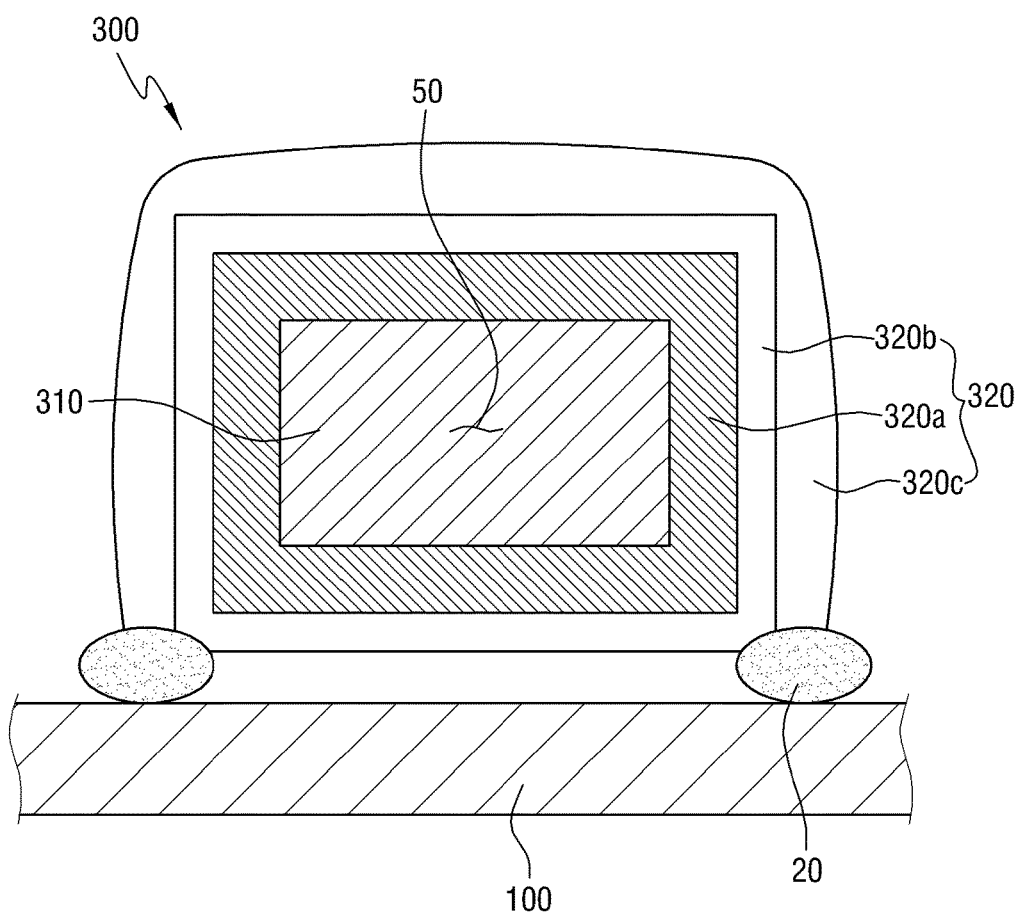
FIG. 5 is a cross-sectional view taken along line B-B' of FIG. 4.

FIG. 4 is a perspective view illustrating the quantum dot package 300, and FIG. 5 is a cross-sectional view taken along line B-B' of FIG. 4. Referring to FIGS. 4 and 5, the encapsulating unit 320 of the quantum dot package 300 may include a polymer resin member 320-a accommodating the quantum dot material 310 therein, and the polymer resin member 320-a may be hermetically sealed with a heat dissipating material 320-b.

In an exemplary embodiment, the polymer resin member 320-a may be a material with excellent light reflectivity.

The heat dissipating material 320-b may dissipate heat generated by the quantum dot material 310 or heat transmitted by the LED package 200, thereby preventing damage to the quantum dot material 310. The heat dissipating material 320-b may be a metallic material. The encapsulating unit 320 may also include a sealing member 320-c hermetically sealing the heat dissipating material 320-b of the quantum dot package 300. The sealing member 320-c may prevent the quantum dot material 310 from leaking.

In an exemplary embodiment, the sealing member 320-c may include a transparent material so that light is transmitted through the light incidence plane 50 and the light emission plane 60. In an exemplary embodiment, the sealing member 320-c may include, but is not limited to, silicone or glass.

Figure 6:
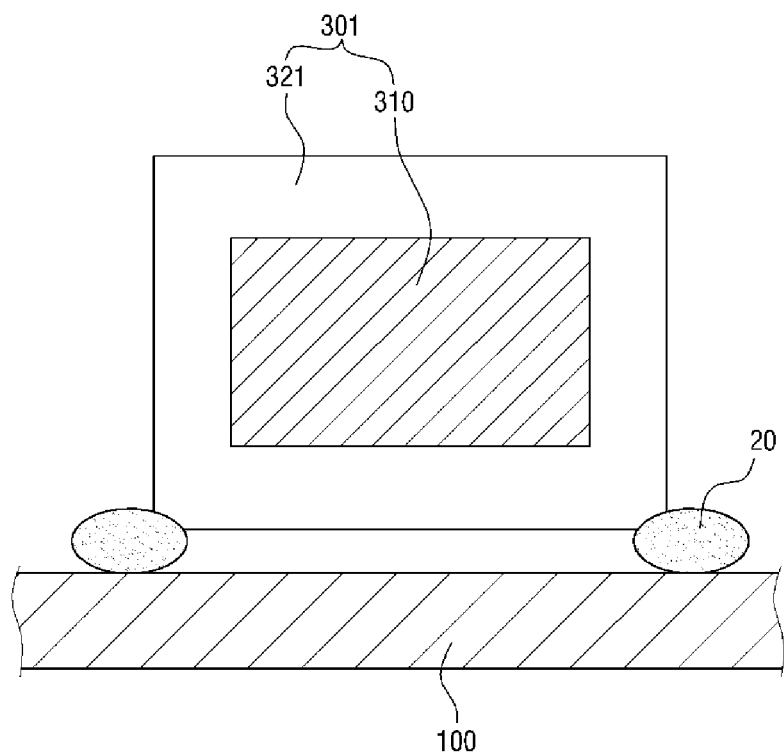
FIG. 6 is a cross-sectional view illustrating another embodiment of a quantum dot package according to the invention.
Figure 7:
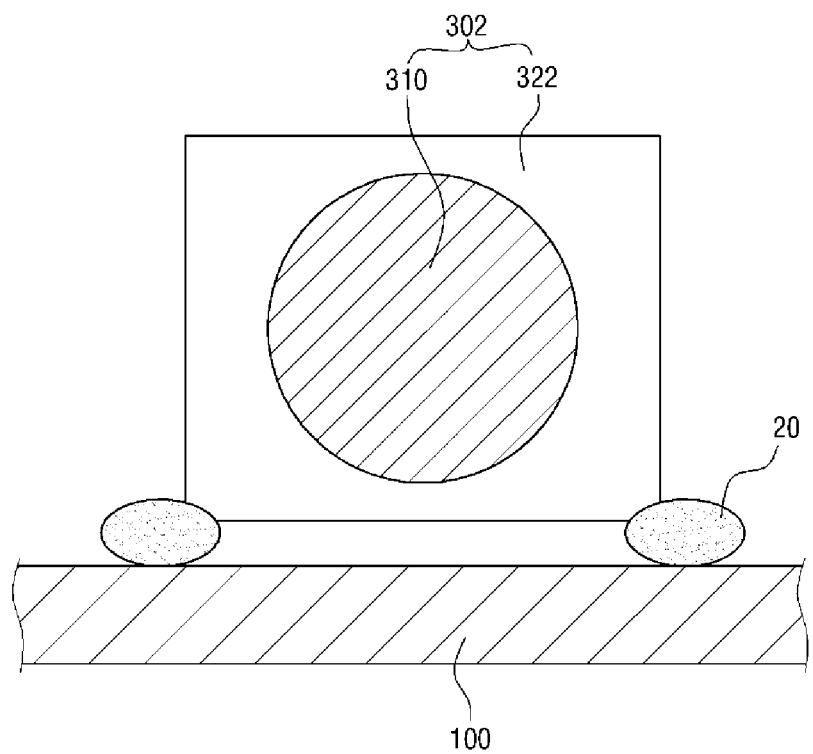
FIG. 7 is a cross-sectional view illustrating another embodiment of a quantum dot package according to another embodiment.
Figure 8:
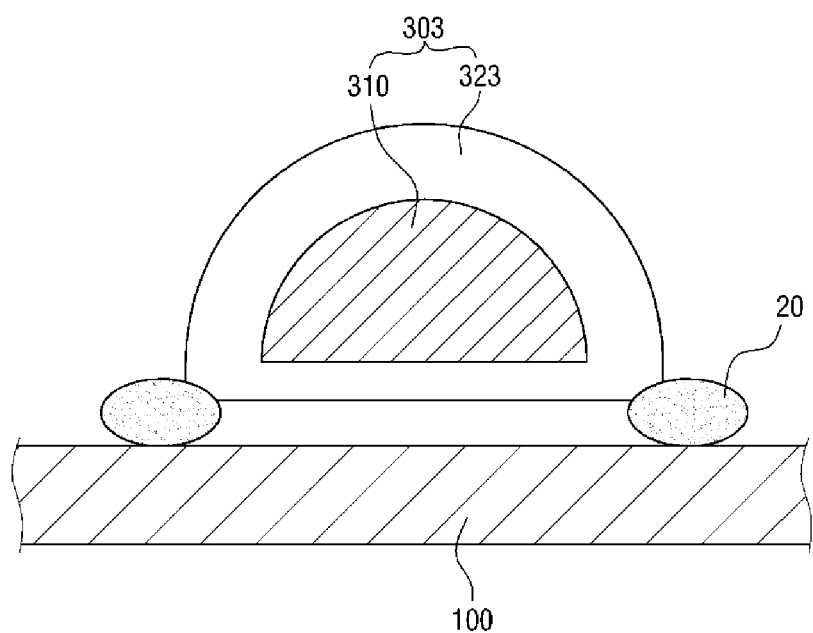
FIG. 8 is a cross-sectional view illustrating another embodiment of a quantum dot package according to another embodiment.
Figure 9:
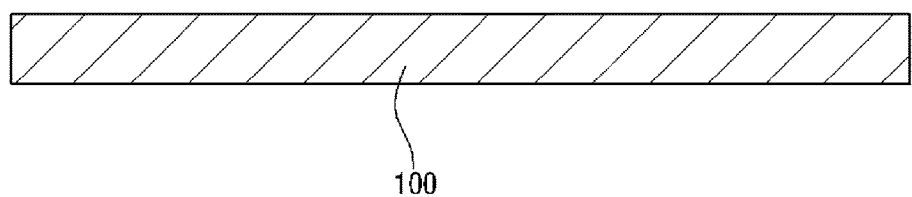
FIGS. 9 to 13 are diagrams illustrating an exemplary embodiment of the manufacture of a light source module according to the invention.
Figure 10:
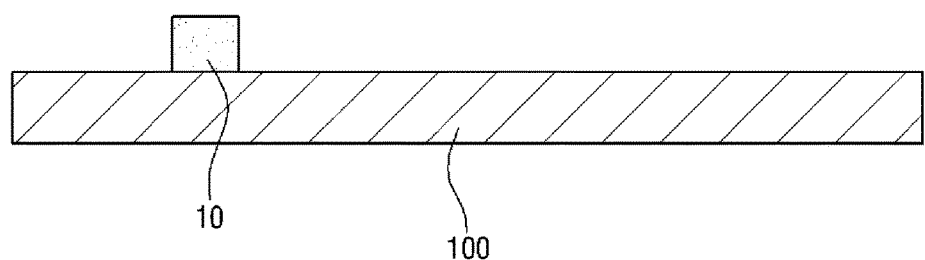
Figure 11:
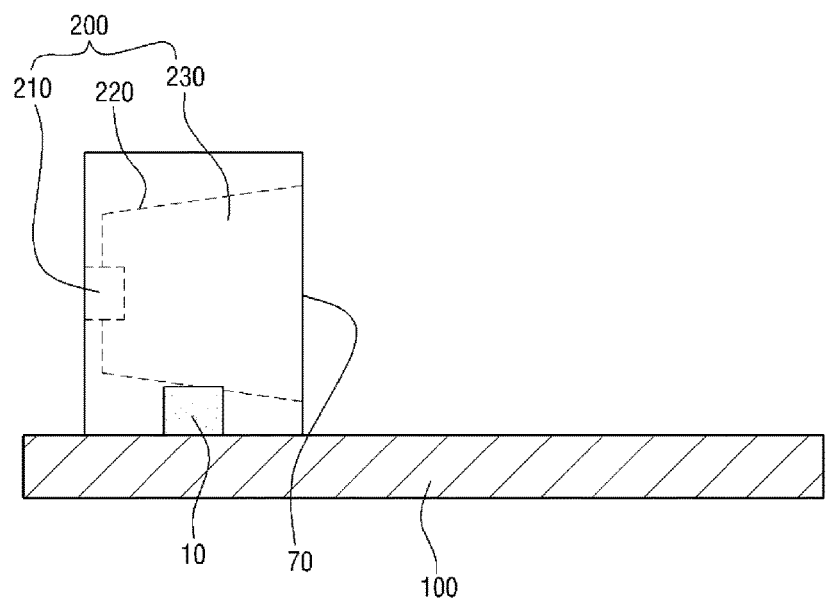
Figure 12:
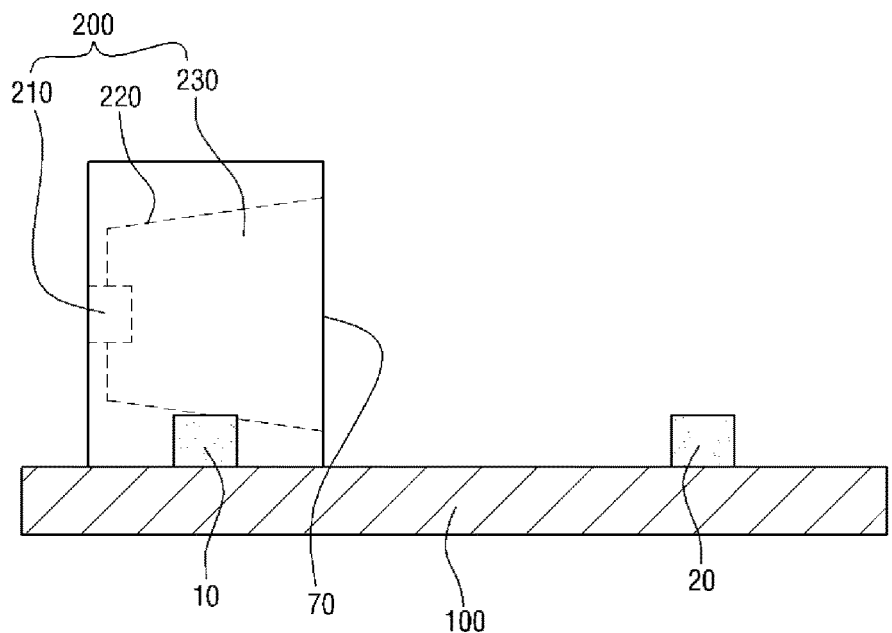
Figure 13:
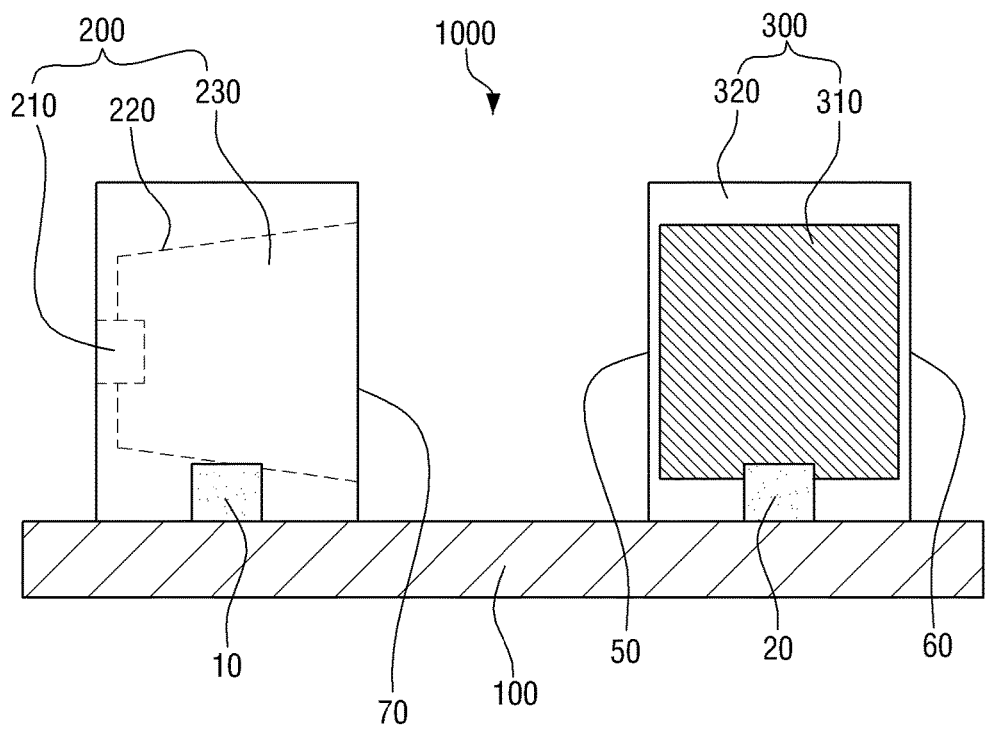

Quantum dot packages according to other exemplary embodiments will hereinafter be described with reference to FIGS. 6 to 8. Referring to FIG. 6, an encapsulating unit 321 of a quantum dot package 301 may include a polymer material and a sealing member, but no heat-dissipating material. Referring to FIG. 7, a quantum dot material 310 of a quantum dot package 302 may include an encapsulating unit 322 which is filled with a quantum dot material 310 having a circular cross-sectional shape. Referring to FIG. 8, a quantum material 310 of a quantum dot package 303 may include an encapsulating unit 323 which is filled with a quantum dot material 310 having a semicircular cross-sectional shape. However, the shape of the quantum dot material 310 is not limited to those illustrated in FIGS. 6 to 8.

Referring back to FIGS. 4 and 5, the quantum dot package 300 may also include mounting dots 20 for mounting the quantum dot package 300 on the circuit board 100. The mounting dots 20 may be disposed between the quantum dot package 300 and the circuit board 100. Accordingly, the quantum dot package 300 may be mounted on the circuit board 100 by the mounting dots 20. In an exemplary embodiment, the mounting dots 20 may have a curved portion.

In an exemplary embodiment, the mounting dots 20 may include lead-free solder (Pb), copper (Cu), aluminum (Al), nickel (Ni), a pressure-sensitive adhesive or an optically transparent adhesive. In an exemplary embodiment, in a case in which the quantum dot package 300 is designed to be mounted on the circuit board 100 a predetermined distance d apart from the LED package 200, the mounting dots 20 may be disposed on the circuit board 100, and the quantum dot package 300 may be mounted on the circuit board 100 by pressing the quantum dot package 300 against the mounting dots 20 or applying heat. In this manner, the quantum dot package 300 may be coupled to, and fixed to, the circuit board 100.

In another exemplary embodiment, instead of mounting the quantum dot package 300 on the circuit board 100 through the mounting dots 20, the quantum dot package 300 may be coupled to the circuit board 100 by providing protrusions or hooks on the outside of the encapsulating unit 320 of the quantum dot package 300, and defining holes in the circuit board 100 so as to correspond to the protrusions and the hooks, respectively. The quantum dot package 300 may be mounted on the circuit board 100 in various manners other than those set forth herein.

The manufacture of a light source module according to an embodiment will hereinafter be described with reference to FIGS. 9 to 13.

Referring to FIGS. 9 to 13, the mounting member 10 is soldered on a portion of the circuit board 100 where the LED package 200 is to be mounted, the circuit board 100 is heated on a hot plate to an appropriate temperature, and the LED package 200 is placed on the mounting member 10. In an exemplary embodiment, the LED package 200 is fixed onto the circuit board 100 by blowing hot wind or applying pressure. The LED chip 210 in the LED package 200 may be disposed to be substantially perpendicular to the circuit board 100. The molding frame 220 of the LED package 200 may include the encapsulating member 230, which is filled with a phosphor material, and the light exit plane 70 may be disposed on the right side of the encapsulating member 230.

In a non-limiting exemplary embodiment, the phosphor material may include at least one of a red phosphor, a green phosphor and a yellow phosphor, and may include at least one of yttrium aluminum garnet ("YAG"), terbium aluminum garnet ("TAG"), silicate, nitride, and oxynitride-based materials, for example.

The position of the quantum dot package 300, which is to be arranged a predetermined distance apart from the LED package 200, may be determined, and the mounting dots 20 may be disposed on a portion of the circuit board 100 where the quantum dot package 300 is to be mounted. In an exemplary embodiment, the mounting dots 20 may be disposed by using the same method used to mount the LED package 200, e.g., by soldering. In an exemplary embodiment, the quantum dot package 300 may be fixed on the mounting dots 20 by applying heat or pressure, for example, thereby fabricating a light source module. The quantum dot package 300 may include the encapsulating unit 320, which is hermetically sealed with the quantum dot material 310, and may include the light incidence plane 50, which receives light, and the light emission plane 60, through which light is emitted. The light incidence plane 50 of the quantum dot package 300 may be disposed to correspond to the light exit plane 70 of the LED package 200.

Figure 14:
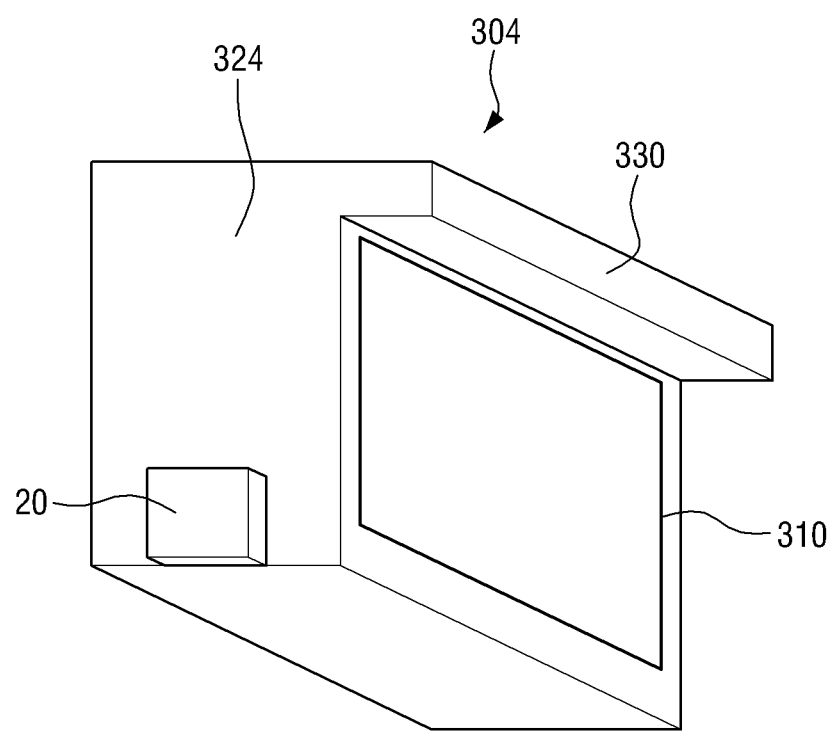
FIG. 14 is a perspective view illustrating another embodiment of a quantum dot package according to another embodiment.
Figure 15:
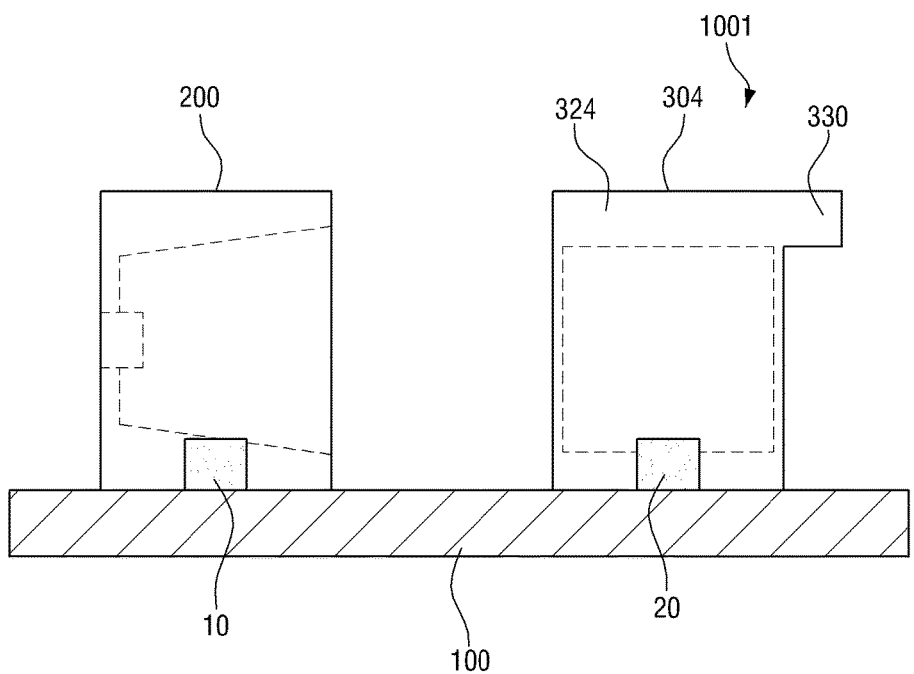
FIG. 15 is a cross-sectional view illustrating a light source module to which the quantum dot package of FIG. 14 is applied.

A light source module according to another embodiment will hereinafter be described with reference to FIGS. 14 and 15. Referring to FIGS. 14 and 15, a quantum dot package 304 may include a light leakage preventing member 330 which protrudes outwardly from the top of a distant side of the quantum dot package 304 from the LED package 200.

To provide the light leakage preventing member 330, an encapsulating unit 324 of the quantum dot package 304 may be provided to protrude to the right from an upper portion of a light emission plane 60. In a non-limiting exemplary embodiment, the light leakage preventing member 330 may be provided to protrude from an upper part of the right side of the quantum dot package 300 in parallel to the circuit board 100, as illustrated in FIGS. 14 and 15. In alternative exemplary embodiment, the light leakage preventing member 330 may be provided to protrude from an upper part of the right side of the quantum dot package 300 at an upward inclination with respect to the circuit board 100. The light leakage preventing member 330 may prevent light emitted from the light emission plane 60 from traveling upwards. More specifically, in response to light being emitted from the light emission plane 60 to travel upwards, instead of traveling directly toward a light guide plate (not illustrated) on one side of the quantum dot package 304, a "light leakage" phenomenon may occur, and may result in luminance irregularities. However, due to the presence of the light leakage preventing member 330, the light traveling upwards may be blocked by, and reflected from, the light leakage preventing member 330 so as to be able to be incident upon the light guide plate.

Figure 16:
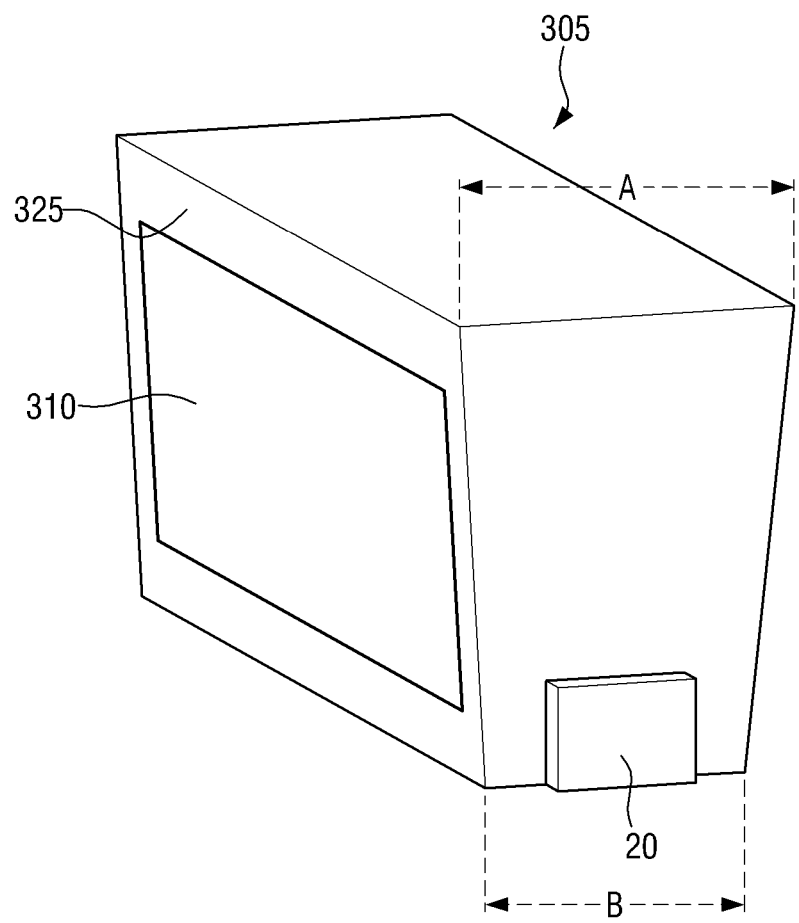
FIG. 16 is a perspective view illustrating another embodiment of a quantum dot package according to the invention.
Figure 17:
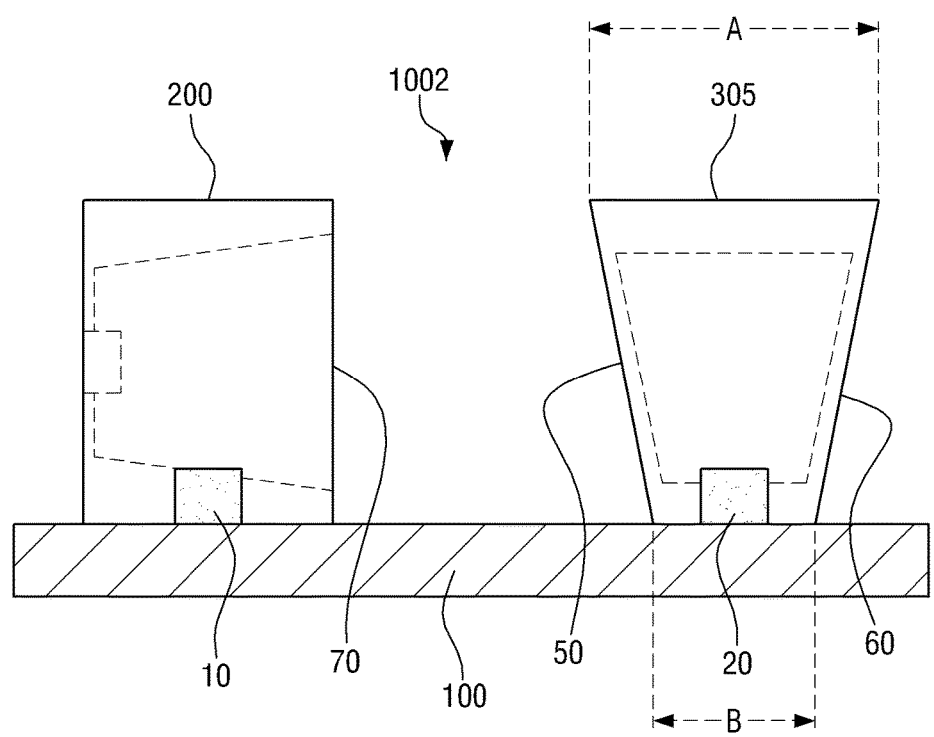
FIG. 17 is a cross-sectional view illustrating a light source module to which the quantum dot package of FIG. 16 is applied.

A light source module according to another embodiment will hereinafter be described with reference to FIGS. 16 and 17. Referring to FIGS. 16 and 17, a quantum dot package 305 may be provided in an inversely tapered shape such that the width of the quantum dot package 305 may gradually decrease from the top to the bottom of the quantum dot package 305. That is, an encapsulating unit 325 may have a tapered cross-sectional shape along the plane passing transversely through both an LED package 200 and the quantum dot package 305.

More specifically, referring to a light source module 1000 of FIG. 17, a width A of the quantum dot package 305 at the top of the quantum dot package 305 may be greater than a width B of the quantum dot package 305 at the bottom of the quantum dot package 305. Accordingly, light emitted from a light emission plane 60 of the quantum dot package 305 may travel downwards. As a result, the amount of light traveling toward the bottom of a light guide plate (not illustrated) may increase, and the reflection of light by the light guide plate may be facilitated so as to properly provide light to a display panel (not illustrated).

Figure 18:
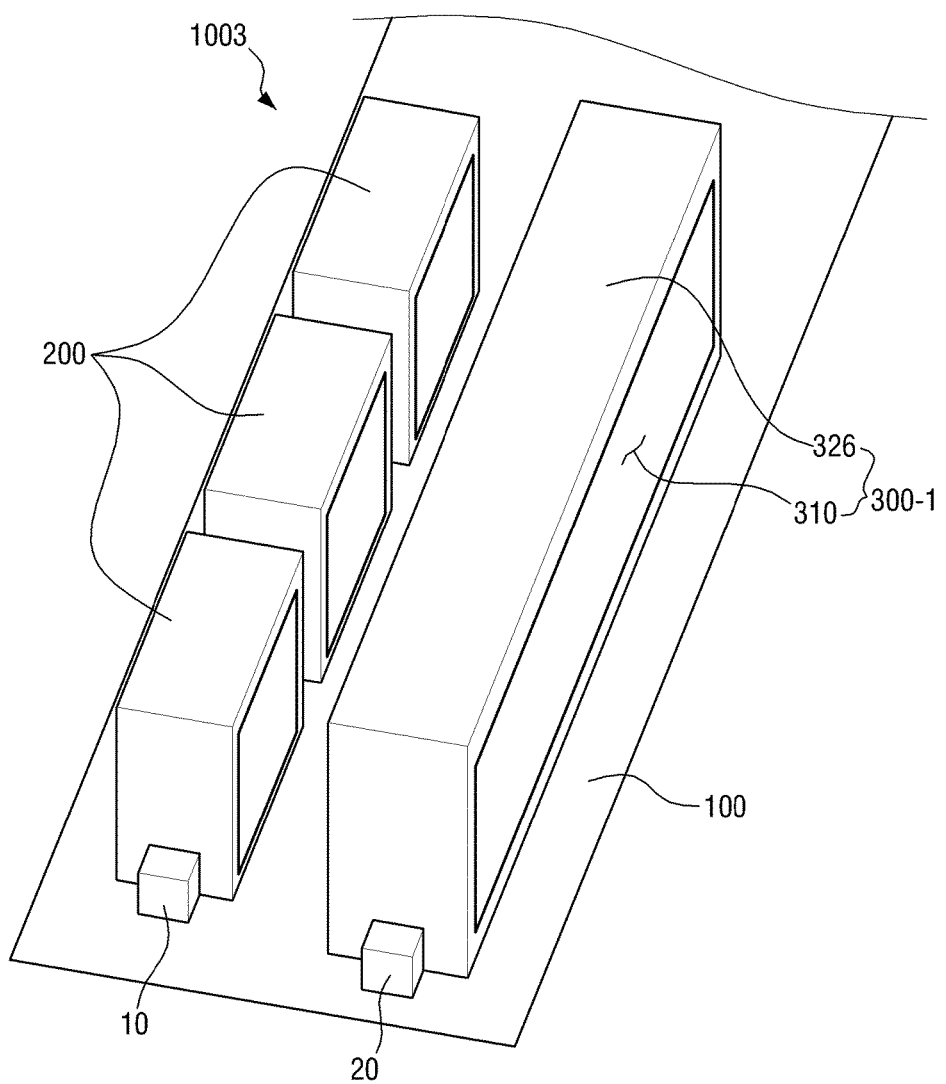
FIG. 18 is a perspective view illustrating another embodiment of a light source module according to the invention.
Figure 19:
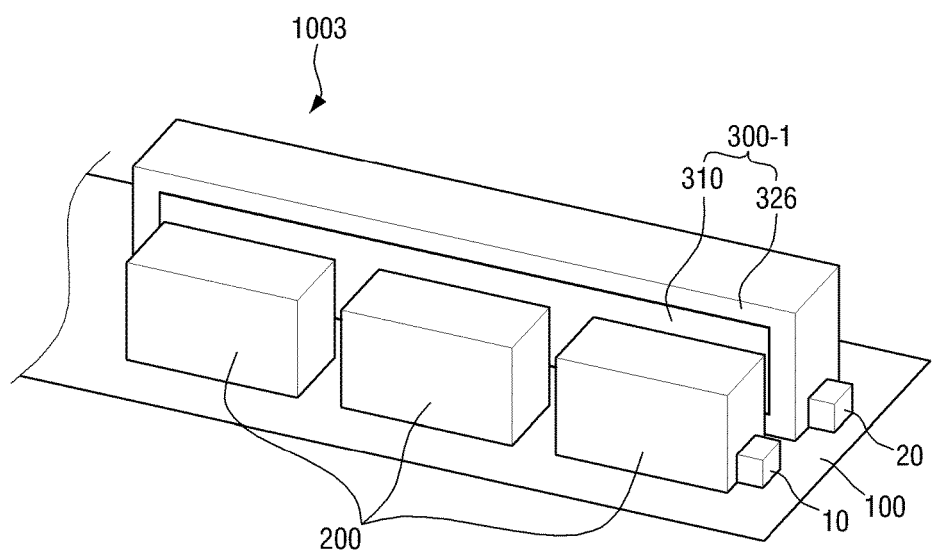
FIG. 19 is another perspective view illustrating the light source module of FIG. 18.

A light source module according to another embodiment will hereinafter be described with reference to FIGS. 18 and 19. Referring to FIGS. 18 and 19, a light source module 1003 may include a circuit board 100, a plurality of LED packages 200 mounted on the circuit board 100 and arranged in a row, and a quantum dot package 300-1 mounted on one side of the circuit board 100 and spaced apart from the LED packages 200 by a predetermined distance. The quantum dot package 300-1 may extend to a length sufficient to overlap the LED packages 200 when viewed from a direction substantially perpendicular to the direction in which the LED packages are arranged.

More specifically, the LED packages 200 may be arranged on the circuit board 100 in one direction, and the quantum dot package 300-1 may extend in the same direction as the direction in which the LED packages 200 are arranged, and may be mounted on the circuit board 100 spaced apart from the LED packages 200 by a predetermined distance. An encapsulating unit 326 of the quantum dot package 300-1 may extend to correspond to the LED packages 200. A quantum dot material 310 may be encapsulated by the encapsulating unit 326. The quantum dot material 310 may transform light incident thereupon from the LED packages 200 into white light through wavelength conversion.

The quantum dot package 300-1, like the quantum dot package 300 of the light source module 1000 in FIGS. 1 to 3, for example, may include a light incidence plane which is disposed on a side of the quantum dot package 300-1 facing the LED packages 200 and receives light, and a light exit plane which is disposed on the other side of the quantum dot package 300-1 and from which light is emitted. Each of the LED packages 200 may include a light emission plane from which light is emitted. The light emission planes of the LED packages 200 may be overlapped and covered by the light incidence surface of the quantum dot package 300-1. That is, when viewed from behind the LED packages 200, the light exit planes of the LED packages 200 may be all covered by the light incidence plane of the quantum dot package 300-1. Accordingly, light emitted from the LED packages 200 may be properly received by the quantum dot material 310 in the quantum dot package 300-1.

Figure 20:
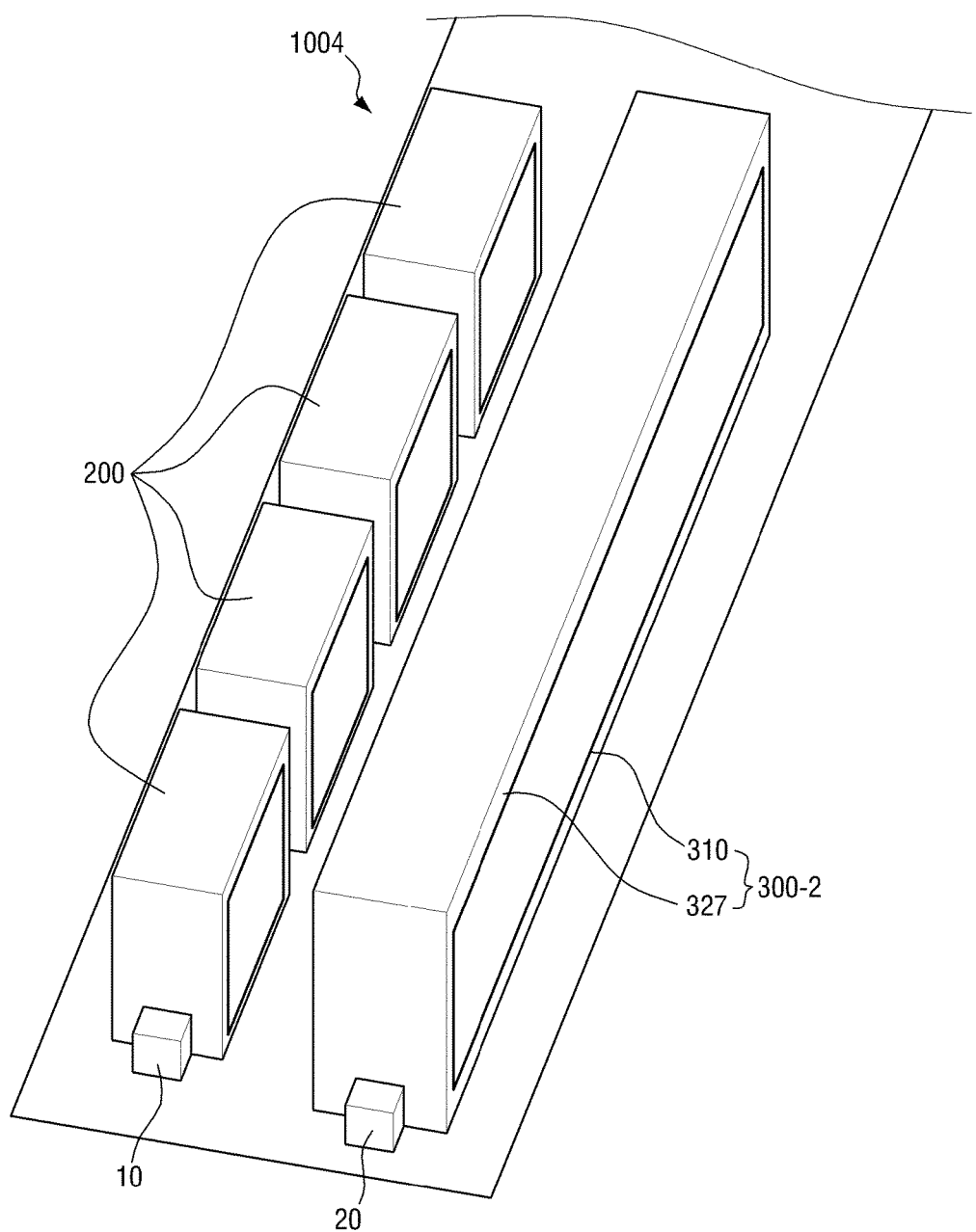
FIG. 20 is a perspective view illustrating another embodiment of a light source module according to the invention.
Figure 21:
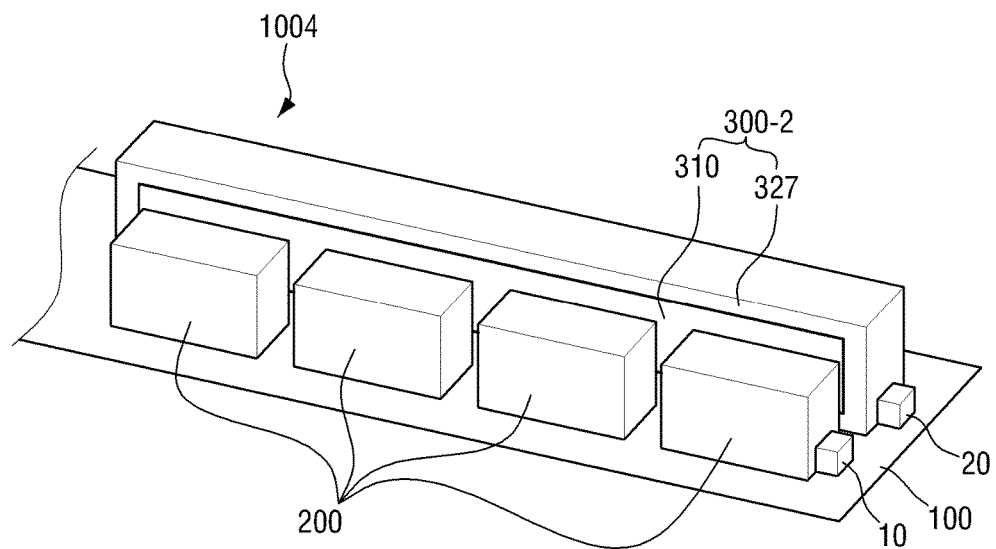
FIG. 21 is another perspective view illustrating the light source module of FIG. 20.

In the light source module 1003, three LED packages 200 are arranged to correspond to a single quantum dot package 300-1, but the invention is not limited to this pattern of arrangement. That is, as illustrated in FIGS. 20 and 21, four LED packages 200 may be arranged to correspond to a single quantum dot package 300-2. The number of LED packages 200 and the length of the quantum dot package 300-1 may be appropriately adjusted for application to a variety of light source modules.

An encapsulating unit 327 of the quantum dot package 300-2 may extend to correspond to the LED packages 200. A quantum dot material 310 may be encapsulated by the encapsulating unit 327.

Figure 22:
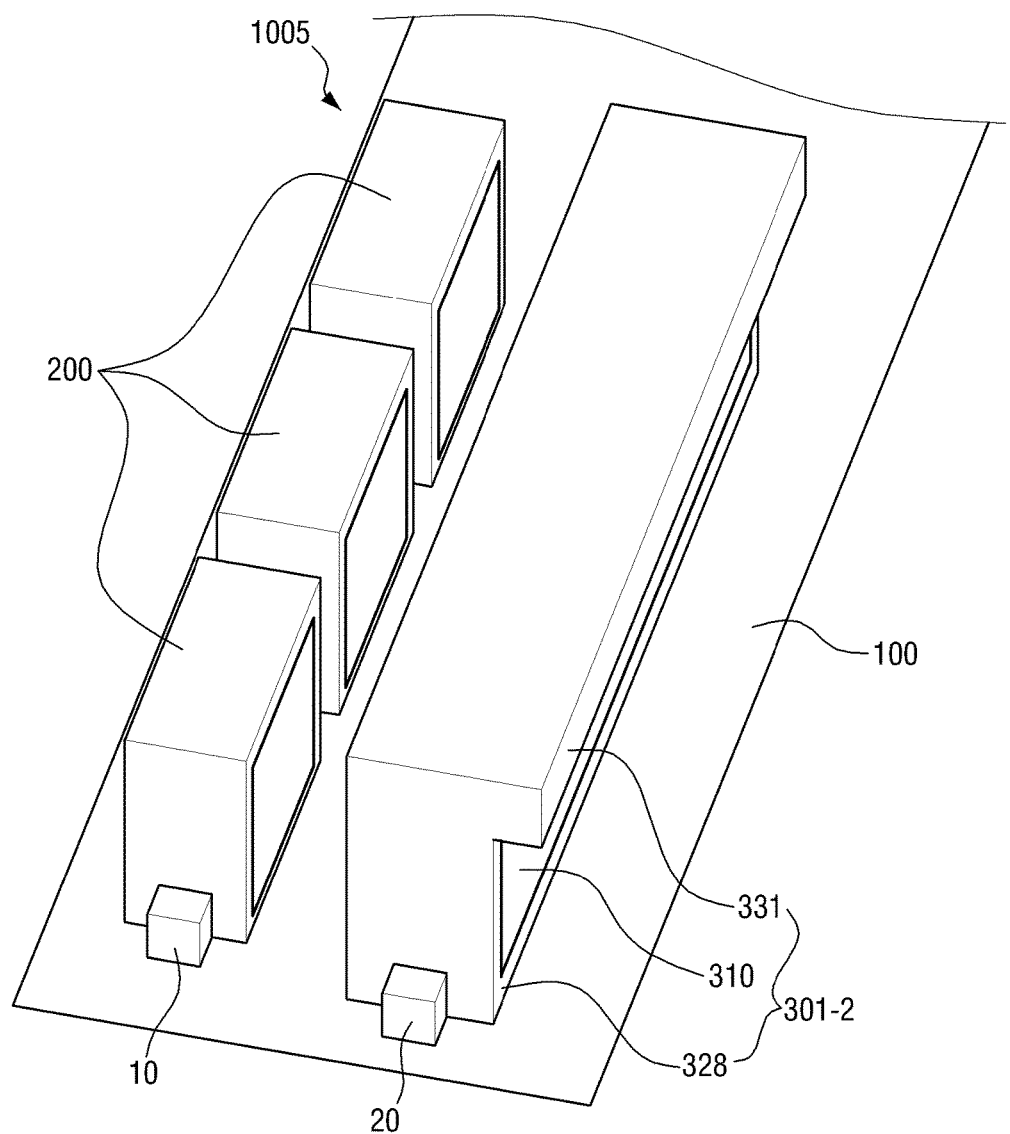
FIG. 22 is a perspective view illustrating another embodiment of a light source module according to the invention.

A light source module according to another embodiment will hereinafter be described with reference to FIG. 22. Referring to FIG. 22, a quantum dot package 301-2 of a light source module 1005 may include a light leakage preventing member 331 which protrudes outwardly from an upper part of the right side of the encapsulating unit 328 toward an opposite direction from a plurality of LED packages 200. The light leakage preventing member 331 may extend in a direction in which the LED packages 200 are arranged. The light source module 1005 has the same structure as the light source module 1003 of FIG. 18 except for the presence of the light leakage preventing member 331. The functions and the benefits of a light leakage preventing member have already been discussed with reference to FIGS. 14 and 15, and thus, detailed descriptions thereof will be omitted.

Figure 23:
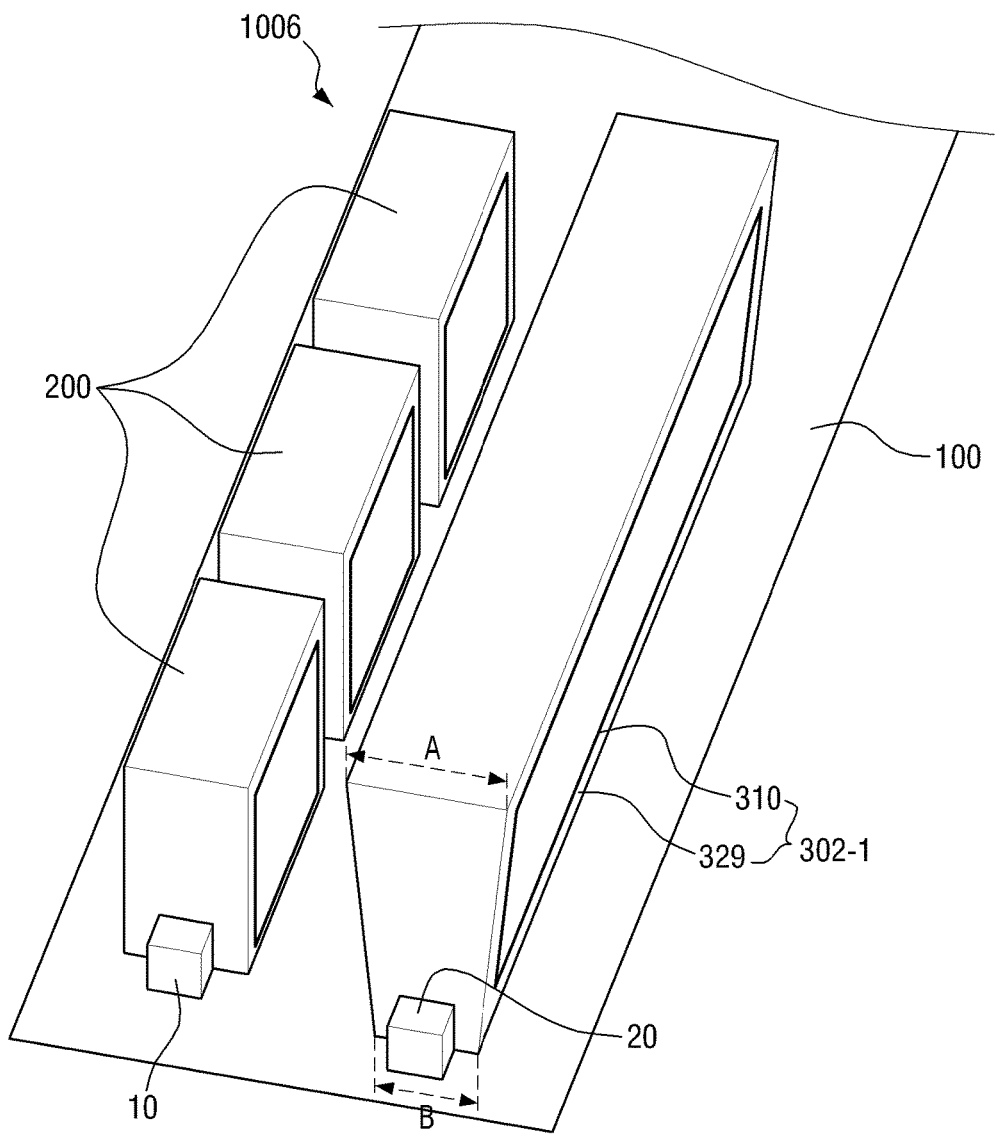
FIG. 23 is a perspective view illustrating another embodiment of a light source module according to the invention.

A light source module according to another embodiment will hereinafter be described with reference to FIG. 23. Referring to FIG. 23, a quantum dot package 302-1 of a light source module 1006 may be provided in an inversely tapered shape such that the width of the quantum dot package 302-1, along a direction in which an array of LED packages 200 and the quantum dot package 302-1 are arranged side-by-side, may gradually decrease from the top to the bottom of the quantum dot package 302-1. In other words, the quantum dot package 302-1 may have an inversely tapered cross-sectional shape along a direction substantially perpendicular to a direction in which the LED packages 200 are arranged side-by-side. That is, a width A of the quantum dot package 302-1 at the top of the quantum dot package 302-1 may be greater than a width B of the quantum dot package 302-1 at the bottom of the quantum dot package 302-1. The light source module 1006 has the same structure as the light source module 1003 of FIG. 18 except for the shape of the quantum dot package 302-1. An encapsulating unit 329 of the quantum dot package 302-1 may extend to correspond to the LED packages 200. A quantum dot material 310 may be encapsulated by the encapsulating unit 329. The functions and the benefits of a quantum dot package with an inversely tapered shape have already been discussed with reference to FIGS. 16 and 17, and thus, detailed descriptions thereof will be omitted.

A backlight unit according to an exemplary embodiment will hereinafter be described with reference to FIG. 1. Referring back to FIG. 1, a backlight unit according to an exemplary embodiment may include the circuit board 100, the LED package 200, which is mounted on the circuit board 100, the quantum dot package 300, which is mounted a predetermined distance apart from one side of the LED package 200 and converts the wavelength of light incident thereupon, and the light guide plate 400, which is disposed on one side of the quantum dot package 300. The quantum dot package 300 may be disposed between the LED package 200 and the light guide plate 400.

The circuit board 100 and the light guide plate 400 may be arranged in parallel to each other. A side of the light guide plate 400 may face the light emission plane 60 of the quantum dot package 300, and wavelength-converted light provided by the quantum dot package 300 may be incident upon the side of the light guide plate 400 so as to be able to incident substantially perpendicularly upon a display panel (not illustrated) at the front of the light guide plate 400.

The light guide plate 400 may enable light transmitted thereto through the quantum dot package 300 to be incident thereupon via the side thereof, and may also enable light to be uniformly emitted therefrom through the top surface thereof. The light guide plate 400 may transform light incident thereupon into planar light by reflecting, refracting and scattering the incident light, and may emit the planar light. In an exemplary embodiment, the light guide plate 400 may include a polymethylmethacrylate ("PMMA") resin, a polycarbonate ("PC") resin, an acrylonitrile-butadiene-styrene copolymer resin, a polystyrene resin, an acrylonitrile-styrene copolymer resin, a polyolefin resin, or a polymethacrylstyrene resin, which is the combination of PMMA and polystyrene.

A reflective sheet (not illustrated) or a reflective pattern (not illustrated) may be disposed on the bottom surface of the light guide plate 400. In response to light arriving at the bottom of the light guide plate 400, the reflective sheet or the reflective pattern may reflect the light toward the top of the light guide plate 400 so that the light travels toward a display panel (not illustrated) disposed above the light guide plate 400.

Figure 24:
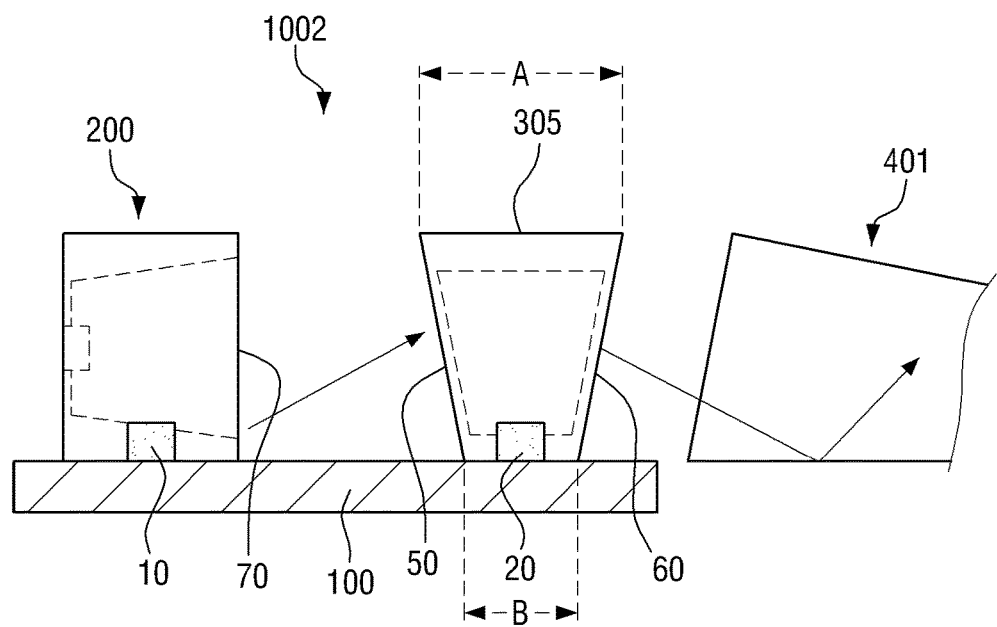
FIG. 24 is a cross-sectional view illustrating the arrangement of the light source module of FIG. 17 and a light guide plate.

Referring to FIG. 24, the quantum dot package 305 may be provided in an inversely tapered shape such that the width of the quantum dot package 305, along a direction in which the LED package 200 and the quantum dot package 305 are arranged side-by-side, may gradually decrease from the top to the bottom of the quantum dot package 305. In an exemplary embodiment, the light guide plate 401 may be provided in the shape of a wedge such that the thickness of the light guide plate 401 may gradually decreases as a distance from the quantum dot package 305 increases. By using the light source module 1002 to which the quantum dot package 305 with an inversely tapered cross-sectional shape and the light guide plate 401, which is of a wedge type, are applied, the thickness of a display device having a backlight unit can eventually be reduced.

Figure 25:
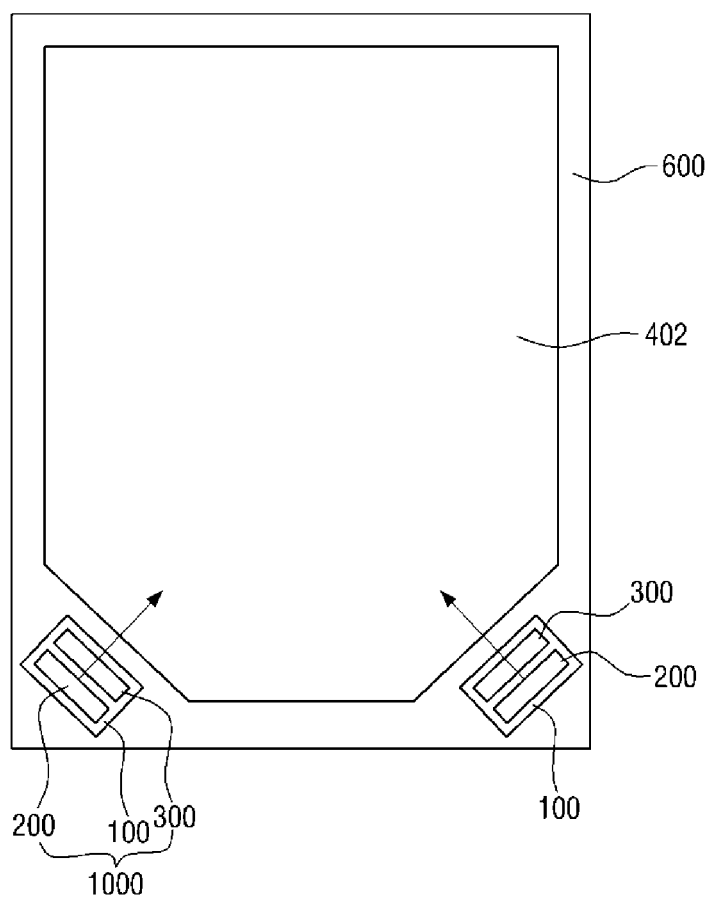
FIG. 25 is a plan view illustrating an exemplary embodiment of a backlight unit according to the invention.

An exemplary embodiment of the application of a light source module according to an exemplary embodiment will hereinafter be described with reference to FIG. 25. Referring to FIG. 25, a light guide plate 402 may be accommodated on a container 600, and two light source modules 1000 may be disposed at two adjacent corners, respectively, of the container 600. Each of the light source modules 1000 may include an LED package 200 and a quantum dot package 300 which are arranged on a circuit board 100 and are on the same horizontal plane, and the LED package 200 and the quantum dot package 300 may be disposed to correspond to each other. Since each of the light source modules 1000 includes the circuit board 100, the LED package 200 and the quantum dot package 300, the light source modules 100 may be freely arranged in a backlight unit.

Figure 26:
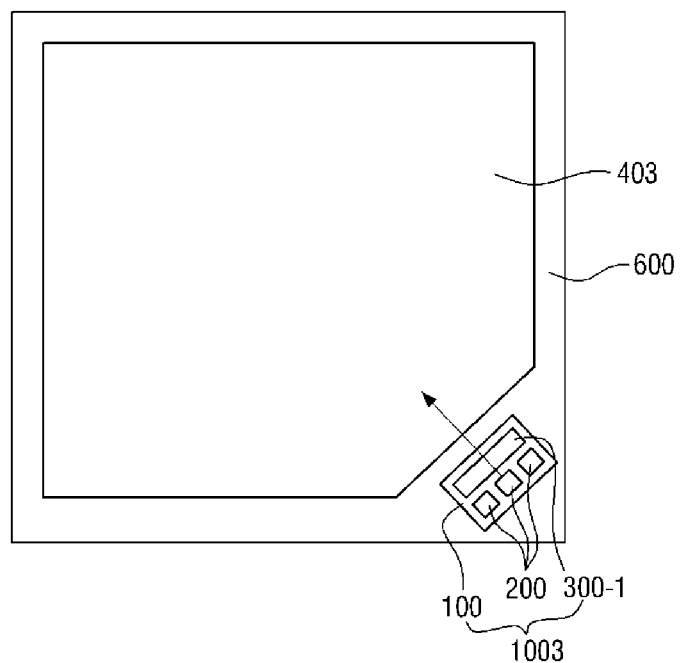
FIG. 26 is a plan view illustrating another embodiment of a backlight unit according to the invention.

Referring to FIG. 26, a light source module 1003 including three LED packages 200 and a quantum dot package 300-1 corresponding to the three LED packages 200 may be disposed on one corner of a light guide plate 403. That is, the shape of a quantum dot package 300-1 may be appropriately designed in consideration of the type of display device to be used, and the number of LED packages 200 to be provided and the length of the quantum dot package 300-1 may be adjusted in consideration of the amount of light that is needed. In an exemplary embodiment, since an LED package 200 and a quantum dot package 300-1 are designed to be a desired distance apart from each other on a circuit board 100, there is no need to additionally design the distance between the LED package 200 and the quantum dot package or a space for accommodating the LED package 200 and the quantum dot package 300-1.

A display device to which a backlight unit according to an exemplary embodiment is applied will hereinafter be described with reference to FIG. 27.

Referring to FIG. 27, a container 600 may include a bottom surface 620 and a plurality of sidewalls 610. A light guide plate 403 may be accommodated on the bottom surface 620 of the container 600, and a light source module may be disposed at one corner of the container 600 to be on one side of the light guide plate 403. The light source module 1003 may include a plurality of LED packages 200 which are mounted on a circuit board 100 and are arranged in one direction, and a quantum dot package 300-1 which is disposed a predetermined distance apart from the LED packages 200.

In the light source module 1003 of the display device of FIG. 27, three LED packages 200 may be provided to correspond to a single quantum dot package 300-1. Since the light source module 1003 is disposed only at one corner of the light guide plate 403, as illustrated in FIG. 27, the display device of FIG. 27 can be miniaturized, and the power consumption of the LED packages 200 can be reduced. Otherwise, for example, when a number of LED packages 200 are disposed along one of the edges of the light guide plate 403, instead of being disposed at only one corner of the light guide plate 403, the size of the display device of FIG. 27 may increase, and the number of LED packages 200 that need to be provided in the display device of FIG. 27 may also increase, thereby resulting in an increase in the manufacturing cost of the display device of FIG. 27.

The light source module 1003 may be disposed on one side of the light guide plate 403, and the light source module 1003 and the light guide plate 403 may both be contained in the container 600, surrounded by the sidewalls 610. A reflective pattern (not illustrated) or a reflective sheet (not illustrated) may be disposed at the bottom of the light guide plate 403, and may reflect light toward the top of the light guide plate 403. A reflective pattern 450 may be provided on the sidewalls 610 of the container 600. Light emitted from the light source module 1003 toward the light guide plate 403 may be reflected from the reflective pattern 450 on the sidewalls 610, and may thus be able to travel back into the light guide plate 403. Accordingly, due to the presence of the reflective pattern 450, the efficiency of incident light from the light source module 1003 may increase.

Optical sheets 700 such as, for example, a diffusion sheet and a prism sheet, may be disposed on the light guide plate 403, and a protective film may also be disposed on the light guide plate 403, when necessary. The diffusion sheet may diffuse light emitted from the light guide plate 403 so as for the light to be supplied to a display panel 800, which is disposed above the light guide plate 403. The prism sheet may enable light diffused by the diffusion sheet to be collected in a direction substantially perpendicular to the plane of the display panel 800. In an alternative exemplary embodiment, a micro-lens array sheet, a lenticular lens sheet and a diffusion plate may be used, instead of the diffusion sheet and the prism sheet. In an alternative exemplary embodiment, two diffusion sheets or two prism sheets may be provided. The optical sheets 700 may be arranged in various manners within the scope of the invention.

The display panel 800 may be disposed on the optical sheets 700. An intermediate frame (not illustrated) may be provided for fixing the light guide plate 403, the light source module 1003 and the optical sheets 700 to the container 600 and accommodating the display panel 800 therein.

The display panel 800 may be a pair of thin-film transistor ("TFT") substrates (not illustrated) with a liquid crystal layer (not illustrated) interposed therebetween, and may include a color filter substrate (not illustrated), a polarizing plate (not illustrated) and a driving integrated circuit ("IC"). The display panel 800 may display an image to a viewer by adjusting the intensity of light incident thereupon from the light source module 1003 in response to power being applied thereto by the driving IC.

A top chassis 900 may be disposed above the display panel 800. The top chassis 900 may include the frame 920 and a display window 910. The top chassis 900 may be coupled to the container 600.

However, the effects of the invention are not restricted to the one set forth herein. The above and other effects of the invention will become more apparent to one of daily skill in the art to which the invention pertains by referencing the claims.

While the invention has been particularly shown and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A light source module, comprising:
a circuit board;
a light-emitting diode package on the circuit board; and
a quantum dot package, which is on the circuit board, comprises an encapsulating unit which accommodates a quantum dot material and is disposed apart from a side of the light-emitting diode package by a distance such that an empty space is defined between the encapsulating unit and the side of the light-emitting diode package, and configured to convert a wavelength of light incident thereupon,
wherein a light-emitting diode chip is disposed on an inner sidewall of a first side of the light-emitting diode package which is opposite to a second side of the light-emitting diode package facing the quantum dot package,
wherein the light-emitting diode chip is disposed between the first side and the second side of the light-emitting diode package, and
wherein the light-emitting diode package and the quantum dot package are disposed on the same circuit board.

2. The light source module of claim 1, wherein the distance between the light-emitting diode package and the quantum dot package is greater than 0 millimeter and less than about 0.8 millimeter.

3. The light source module of claim 1, wherein the quantum dot package comprises a light leakage preventing member protruding outwardly from a top of the quantum dot package in a direction away from the light-emitting diode package.

4. The light source module of claim 1, wherein the quantum dot package has an inversely tapered shape such that a width of the quantum dot package gradually decreases from a top to a bottom of the quantum dot package.

5. The light source module of claim 1, wherein the light-emitting diode package and the quantum dot package are disposed on the same horizontal plane in a cross section.

6. The light source module of claim 1, wherein the light-emitting diode package comprises a light-emitting diode chip electrically connected to the circuit board, and a surface of the light-emitting diode chip is substantially perpendicular to the circuit board.

7. The light source module of claim 1, wherein the light-emitting diode package comprises a light exit plane through which light is emitted, and the light exit plane is substantially perpendicular to the circuit board.

8. The light source module of claim 1, further comprising:
mounting dots disposed between the quantum dot package and the circuit board,
wherein the quantum dot package is mounted on the mounting dot disposed on the circuit board.

9. The light source module of claim 8, wherein the mounting dots include lead-free solder (Pb), copper (Cu), aluminum (Al), nickel (Ni), a pressure-sensitive adhesive or an optically transparent adhesive.

10. The light source module of claim 1, wherein the quantum dot package further comprises:
a light incidence plane which is provided on a first side of the encapsulating unit facing the light-emitting diode package and receives light, and
a light emission plane which is provided on a second side opposing the first side of the encapsulating unit and through which the received light is emitted.

11. The light source module of claim 10, wherein the encapsulating unit includes a heat-dissipating material.

12. A light source module, comprising:
a circuit board;
a plurality of light-emitting diode packages which is mounted on the circuit board and arranged in a row direction; and
a quantum dot package which comprises an encapsulating unit which accommodates a quantum dot material and is disposed apart from a side of a light-emitting diode package of the plurality of light-emitting diode packages by a predetermined distance such that an empty space is defined between the encapsulating unit and the side of the light-emitting diode package, and extends in the row direction in which the plurality of light-emitting diode packages is arranged,
wherein the quantum dot package extends to a length sufficient to overlap the plurality of light-emitting diode packages when viewed from a direction substantially perpendicular to the direction in which the plurality of light-emitting diode packages is arranged,
a light-emitting diode chip is disposed on an inner sidewall of a first side of the light-emitting diode package which is opposite to a second side of the light-emitting diode package facing the quantum dot package,
wherein the light-emitting diode chip is disposed between the first side and the second side of the light-emitting diode package, and wherein the light-emitting diode package and the quantum dot package are mounted on the same circuit board.

13. The light source module of claim 12, wherein the plurality of light-emitting diode packages and the quantum dot package are disposed on the same horizontal plane in a cross section.

14. The light source module of claim 12, wherein
the quantum dot package further comprises:
a light incidence plane which is provided on a first side of the encapsulating unit facing the plurality of light-emitting diode packages and receives light, and
a light emission plane which is provided on a second side opposing the first side of the encapsulating unit and through which the received light is emitted, and
each of the plurality of light-emitting diode packages comprises a light exit plane through which light is emitted and is overlapped by the light incidence plane of the quantum dot package.

15. The light source module of claim 12, wherein the quantum dot package further comprises a light leakage preventing member protruding outwardly from a top of the quantum dot package in a direction away from the plurality of light-emitting diode packages, and the light leakage preventing member extends in the direction in which the plurality of light-emitting diode packages is arranged.

16. The light source module of claim 12, wherein the quantum dot package is further configured to have an inversely tapered shape such that a width of the quantum dot package, in a direction substantially perpendicular to the direction in which the plurality of light-emitting diode packages is arranged, gradually decreases from the top to the bottom of the quantum dot package.

17. A backlight unit, comprising:
a circuit board;
a light-emitting diode package mounted on the circuit board;
a quantum dot package which comprises an encapsulating unit which accommodates a quantum dot material and is disposed apart from a side of the light-emitting diode package by a predetermined distance such that an empty space is defined between the encapsulating unit and the side of the light-emitting diode package, mounted on the circuit board and configured to convert the wavelength of light incident thereupon; and
a light guide plate disposed on a side of the quantum dot package,
wherein the quantum dot package is disposed between the light-emitting diode package and the light guide plate,
wherein a light-emitting diode chip is disposed on an inner sidewall of a first side of the light-emitting diode package which is opposite to a second side of the light-emitting diode package facing the quantum dot package,
wherein the light-emitting diode chip is disposed between the first side and the second side of the light-emitting diode package, and
wherein the light-emitting diode package and the quantum dot package are mounted on the same circuit board.

18. The backlight unit of claim 17, wherein the circuit board and the light guide plate are parallel to each other.

19. The backlight unit of claim 17, wherein the quantum dot package has an inversely tapered shape such that a width of the quantum dot package gradually decreases from a top to a bottom of the quantum dot package.

20. The backlight unit of claim 19, wherein the light guide plate has a shape of a wedge, and has a thickness which gradually decreases as a distance from the quantum dot package increases.

* * * * *